Dec. 12, 1967      B. L. BERG      3,357,614

TRASH CONTAINER FOR AUTOMOBILES

Filed Oct. 7, 1966      2 Sheets-Sheet 1

INVENTOR
Bennie L. Berg

Dec. 12, 1967    B. L. BERG    3,357,614
TRASH CONTAINER FOR AUTOMOBILES
Filed Oct. 7, 1966    2 Sheets-Sheet 2

Inventor
Bennie L. Berg

United States Patent Office 3,357,614
Patented Dec. 12, 1967

3,357,614
TRASH CONTAINER FOR AUTOMOBILES
Bennie L. Berg, P.O. Box 3214, Madison, Wis. 53704
Filed Oct. 7, 1966, Ser. No. 585,102
5 Claims. (Cl. 224—29)

ABSTRACT OF THE DISCLOSURE

An open topped receptacle having its bottom curved to seat on the transmission hump is held there by a clip having parallel prongs adapted to be pierced through and underlie the floor covering. Each prong comprises a longer leg of a U, the shorter leg of which overlies the floor covering above the prong to stabilize the clip. An upright member projects from and bridges the shorter legs and is receivable in downwardly opening pocket means in the receptacle. The receptacle can be installed and removed by vertical translatory motion.

---

This invention relates to trash containers for automobiles, and pertains more especially to a litter container which is adapted to be readily removably fastened onto the transmission hump in the front passenger compartment of an automobile, where it occupies space not otherwise useful and is readily accessible to occupants of the front seat of the car.

There is now a widespread awareness of the problem created by littering, that is, the practice of discarding trash from automobiles moving along the streets and highways, and in many States littering is a misdemeanor punishable by a more or less substantial fine. But unconfined trash inside an automobile is apparently more objectionable to its occupants than litter along the wayside, since littering continues in spite of the vigorous efforts to halt it.

What is obviously needed for discouragement of littering is a satisfactory trash container inside the automobile. To be a successful deterrent to littering, such a container must be at least as conveniently accessible as the window of the automobile; it must not be in the way of occupants of the car nor be located in a place where they are inclined to store small articles such as gloves and purses; it should be attractive in appearance; it should not move around or rattle; and it should be very readily removable for emptying and very readily replaceable when emptied.

The general object of this invention is to provide an automobile trash container that meets all of these requirements and which, moreover, requires no installation of fixtures that would noticeably mar or deface the automobile.

It is another and more specific object of this invention to provide an automobile trash container that occupies otherwise useless space on top of the transmission hump commonly present in the floor of the front compartment of an automobile, where the container is readily accessible to front seat occupants without in any way being in their way, and which container comprises a receptacle that is readily removably held in place by means of a simple, inexpensive and easily installed clip that cooperates with the mat of rubber or carpet material that usually overlies the transmission hump.

Another specific object of this invention is to provide a clip or retainer for a trash receptacle of the character described, formed from a single piece of wire and which is readily installed on and securely held in place by the mat on the transmission hump of an automobile front compartment.

It is also an object of this invention to provide a trash container of the character described that is adapted to be quickly and easily installed in an automobile front compartment and is equally suitable for cars having a transmission hump in the front compartment floor and for those having a flat front floor.

With the above and other objects in view which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawing illustrates one complete example of the physical embodiment of the invention constructed according to the best mode so far devised for the practical application of the principles thereof, and in which.

Figure 1:
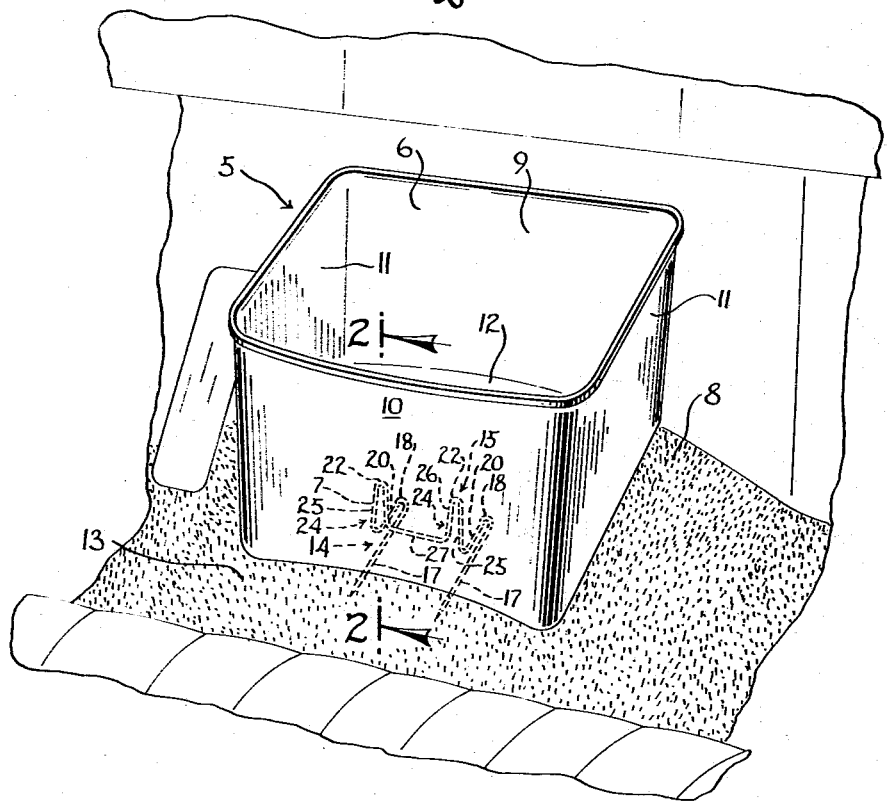
FIGURE 1 is a perspective view looking forwardly and downwardly in the front passenger compartment of an automobile and showing a trash container of this invention installed on the transmission hump therein.
Figure 2:
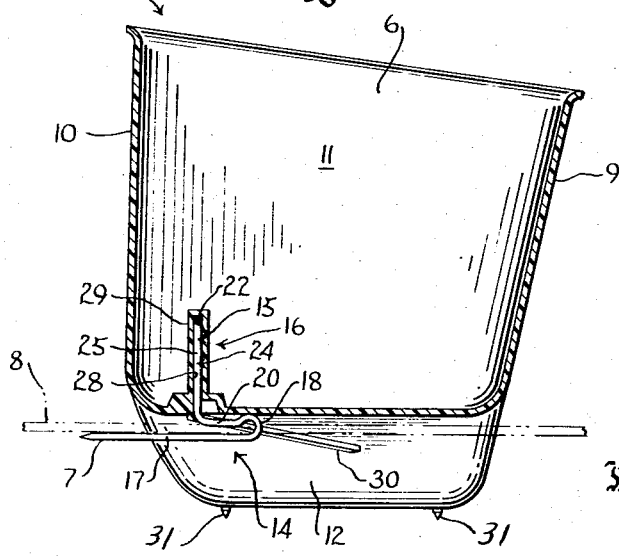
FIGURE 2 is a sectional view taken on the plane of the line 2—2 in FIGURE 1.
Figure 3:
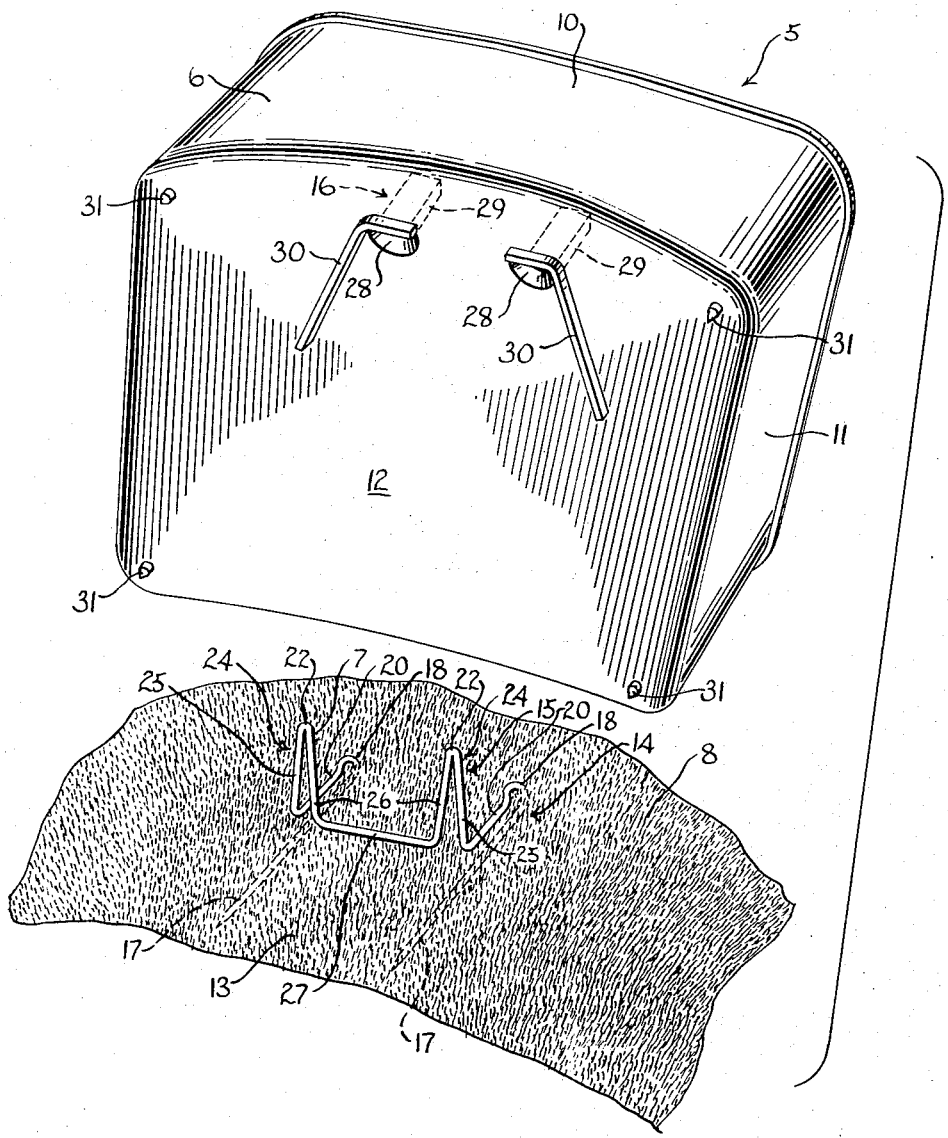
FIGURE 3 is a perspective view showing the receptacle of the trash container of this invention in disassembled relation to its clip or retainer.

Referring now to the accompanying drawings, the numeral 5 designates generally the trash container of this invention, which comprises, in general, an open-topped receptacle 6 and a clip or retainer 7 by which the receptacle can be readily detachably secured to the floor covering mat 8 that is usually present in the front compartment of an automobile.

The container has a front wall 9, a rear wall 10 and opposite side walls 11. Its bottom wall 12 is downwardly concave as viewed from the front or the rear of the container so as to conformably seat on the transmission hump 13 in the front compartment floors of most automobiles. The transmission hump, and particularly the front portion thereof adjacent to the front bulkhead or firewall, is a desirable location for a trash container because it is out of the way of occupants of the front seat of the automobile, although readily accessible to them, and it is not ordinarily used for storage of handbags or the like because of its convex curvature.

The clip or retainer 7 so cooperates with the front compartment mat 8 (which is usually either of rubber or carpet material) as to hold the receptacle 6 against sliding off of the transmission hump or rattling, but it nevertheless provides for very quick and easy removal and installation of the receptacle so that it can be readily emptied, and the clip is in itself easy to install.

In general the clip or retainer 7 has a base portion 14 which engages the mat 8 over the transmission hump, and an upright member 15 which is rigidly connected with the base 14 and which cooperates with means 16 on the receptacle to confine the receptacle against horizontal motion relative to the clip.

The base 14 of the clip comprises a pair of generally U-shaped mat gripping elements which are held in spaced, parallel relationship by their rigid connections with the upright member 15, and each of which comprises a longer lower leg 17 which serves as a prong that underlies the mat, a bight portion 18 which extends through the mat, and an upper leg 20 which overlies the mat and which is connected with the upright member 15. The U-shaped mat gripping elements are thus substantially immobilized by their engagement with a mat by reason of the fact that portions of the mat are more or less clampingly confined between the prongs 17 and the shorter legs 20, while the engagement of the bight portions 18 in closely fitting holes in the mat prevents motion of the clip in directions parallel to the plane of the mat. Furthermore, the upright member 15 projects upwardly from the base 14 on a plane transverse to the prongs and intermediate their ends, and consequently lateral forces on the upright member do not tend to tilt the clip and thereby permit the prongs to back out of the holes in the mat.

Preferably the free ends of the prongs 17 are more or less pointed, to facilitate their penetration of the mat, and it will be observed that the holes in the mat through which the bight portions 18 extend will normally be so small as to be practically unnoticeable when the clip is removed.

In its preferred form, illustrated in the accompanying drawings, the clip is bent from a single piece of light rod stock or wire, of which the prongs 17 comprise straight end portions while the upright member 15 comprises the medial portion of the wire, which is bent to a U-shape and is disposed in a vertical plane transverse to the planes of the U-shaped mat gripping elements comprising the base.

As shown, the U-shaped upright member 15 of the clip has its legs 24 projecting upwardly, and each of said legs 24, in turn, has a narrow U-shape, with its bight portion 22 uppermost. The outer leg 25 of each of the narrow inverted U's 24 is connected at its lower end with the short upper leg 20 of its adjacent U-shaped mat gripping element, while the inner legs 26 of the narrow U's connect with the bight portion 27 of the upright member, which is preferably substantially coplanar with said shorter legs 20.

The narrow U-shaped legs 24 of the upright member 15 of the clip are received in substantially closely fitting downwardly opening pockets or wells 28 in the receptacle to confine the latter against horizontal motion relative to the clip. The receptacle can be molded of a suitable plastic, such as polystyrene, with upwardly projetcing boss portions 29 on its bottom wall 12, spaced equal distances to opposite sides of its fore-and-aft center line, in which the pockets or wells 28 are formed.

To install the trash container of this invention in an automobile, the prongs 17 of the clip are pushed through the mat on the transmission hump at a suitable distance rearwardly of the front bulkhead, and they are slid either rearwardly (as shown) or forwardly beneath the mat until the bight portions 18 of the U-shaped mat gripping elements are received in the holes in the mat through which the prongs were inserted. The receptacle is then set in place to have its pockets or wells 28 engaged with the upwardly projecting legs 24 on the clip.

To facilitate engagement of the legs 24 in the pockets 28, the receptacle can be provided with ribs or lands 30 on the underside of its bottom wall that diverge forwardly away from the wells 28 and have their rear ends closely adjacent to the remote edges of the wells. These ribs of course guidingly engage the tops of the legs 24 as the receptacle is slid forwardly over the latter until the wells 28 are brought into register with the legs.

The upstanding legs 24 on the clip are preferably long enough so that they can project into the wells or pockets 28 even when the prongs 17 are disposed substantially coplanar with the lower side edges of the receptacle, so that the container of this invention is well adapted for use in an automobile having a flat floor in its front compartment, as well as in cars having the more usual transmission hump. Preferably the receptacle has downwardly projecting spur-like feet 31 near the corners of its bottom wall, engageable with the ridges of a rubber mat or the pile of a mat of carpet material, to cooperate with the clip in holding the receptacle against lateral movement.

From the foregoing description taken with the accompanying drawings it will be apparent that this invention provides an inexpensive, convenient and very easily installed trash receptacle for automobiles, adapted to occupy a position on the front of the transmission hump where it is readily accessible to the driver and passengers but out of their way, and where it does not take up space normally used for other purposes.

What is claimed as my invention is:

1. A trash container for an automobile front compartment comprising:
   (A) a receptacle having substantially upright front, rear and side walls and a bottom wall which is downwardly concave as viewed from the front and rear of the container so as to seat conformably on an automobile transmission hump;
   (B) a clip comprising a base having a pair of spaced parallel, coplanar prongs adapted to flatwise underlie a floor covering, each having an upwardly bent portion at one end adapted to extend through a hole in the floor covering; and
   (C) cooperating securement means on the clip and on the receptacle, engageable upon downward motion of the receptacle relative to the clip, for holding the receptacle against horizontal motion relative to the clip, said securement means comprising
      (1) an upright member on the clip rigidly connected with said upwardly bent portion on its base; and
      (2) downwardly opening pocket defining means on the receptacle in which said upright member on the clip is receivable.

2. The trash container of claim 1, further characterized by:
   a pair of downwardly projecting lands on the bottom wall of the receptacle having front end portions adjacent to the laterally remote edges of the pocket defining means and which extend rearwardly in divergent relationship, said lands being cooperable with the top of said upright member to guide the receptacle in rearward and lateral motion by which the pocket defining means and upright member are brought into register.

3. The trash container of claim 1, further characterized by:
   said base of the clip also having means substantially rigidly connected with said upwardly bent portions of the prongs and with said upright member and disposed in upwardly spaced relation to the plane of the prongs for overlying the upper surface of the floor covering to cooperate therewith in confiining the clip against displacement.

4. The trash container of claim 3 further characterized by said clip being formed from a single piece of wire, of which:
   (A) said prongs comprise straight end portions;
   (B) said means for overlying the upper surface of the floor covering comprises a straight stretch extending parallel to each prong partway along the length of the prong from said upwardly bent portion; and
   (C) said upright member on the clip comprises a U-shaped medial portion of the wire piece having its legs connected with said straight stretches.

5. The trash container of claim 4 further characterized by:

(A) said U-shaped upright member on the clip having its bight portion lowermost and having its legs defined by narrow U-shaped sections of the wire that have their bight portions uppermost; and
(B) said pocket defining means on the receptacle comprising means on its bottom wall defining a pair of downwardly opening laterally spaced wells in which the legs of the U-shaped upright member on the clip are receivable.

References Cited

UNITED STATES PATENTS

| | | | |
|---|---|---|---|
| 2,988,206 | 6/1961 | Olson | 224—29 |
| 3,022,883 | 2/1962 | Barton et al. | 224—29 |

JOSEPH R. LECLAIR, *Primary Examiner.*

THERON E. CONDON, *Examiner.*

J. M. CASKIE, *Assistant Examiner.*